United States Patent [19]

Beyrle et al.

[11] Patent Number: 5,605,591
[45] Date of Patent: Feb. 25, 1997

[54] PROCESS FOR THE PREPARATION OF A LAMINATED ENAMELLED GLAZING AND ENAMEL COMPOSITION USED

[75] Inventors: Andre Beyrle, Trancy-le-Val, France; Walter Goerenz, Alsdorf, Germany; Dieter Küstner, Herzogenrath, Germany; Wolfgang Schafer, Aachen, Germany

[73] Assignee: Saint-Gobain Vitrage International, Courbevoie, France

[21] Appl. No.: 338,515

[22] PCT Filed: Mar. 22, 1994

[86] PCT No.: PCT/FR94/00311

§ 371 Date: Jan. 30, 1995

§ 102(e) Date: Jan. 30, 1995

[87] PCT Pub. No.: WO94/22779

PCT Pub. Date: Oct. 13, 1994

[30] Foreign Application Priority Data

Mar. 26, 1993 [FR] France .................. 93 03520
May 13, 1993 [FR] France .................. 93 05750

[51] Int. Cl.$^6$ .............. C03B 40/033; C03C 8/16; C03C 8/22; B32B 17/10
[52] U.S. Cl. .............. 156/106; 65/60.5; 65/60.8; 65/106; 156/278; 219/203; 428/428; 428/437; 501/20; 501/22
[58] Field of Search .............. 156/99, 102, 106, 156/278; 65/106, 107, 60.1, 60.5, 60.8, 60.7; 501/17, 20, 22; 219/203; 428/437, 428

[56] References Cited

U.S. PATENT DOCUMENTS

| 4,373,130 | 2/1983 | Krasborn et al. | 219/203 |
| 4,551,372 | 11/1985 | Kunert | 428/38 |
| 4,684,389 | 8/1987 | Boaz | 65/60.1 X |
| 4,959,090 | 9/1990 | Reinhertz | 65/60.4 |
| 5,093,285 | 3/1992 | Murkens | 501/17 |

FOREIGN PATENT DOCUMENTS

| 0200475 | 12/1986 | European Pat. Off. |
| 0299672 | 1/1989 | European Pat. Off. |
| 0326519 | 8/1989 | European Pat. Off. |
| 0362136 | 4/1990 | European Pat. Off. |
| 0370683 | 5/1990 | European Pat. Off. |
| 0404678 | 12/1990 | European Pat. Off. |
| 0427619 | 5/1991 | European Pat. Off. |
| 0466343 | 1/1992 | European Pat. Off. |
| 0509858 | 10/1992 | European Pat. Off. |
| 0545166 | 6/1993 | European Pat. Off. |
| 0553003 | 7/1993 | European Pat. Off. |
| 2512434 | 3/1983 | France. |
| 1927019 | 12/1970 | Germany. |
| 2610213 | 9/1977 | Germany. |
| 2072159 | 9/1981 | United Kingdom. |

Primary Examiner—Michael W. Ball
Assistant Examiner—Francis J. Lorin
Attorney, Agent, or Firm—Oblon, Spivak, McClelland, Maier & Neustadt, P.C.

[57] ABSTRACT

The invention relates to a method for fabricating laminated glazing comprising at least one enamel layer, wherein is deposited an enamelled composition comprising an anti-adhesive frit, a medium and, optionally, a low melt point frit on a portion of the internal face of a glass sheet; the enamelled glass sheet is subjected to heat treatment at a temperature between 150° C. and the glass deformation temperature, and a second glass sheet is placed on the enamelled side of the first glass sheet before simultaneous bending of the two glass sheets, final firing of the enamel taking place during bending.

26 Claims, No Drawings

PROCESS FOR THE PREPARATION OF A LAMINATED ENAMELLED GLAZING AND ENAMEL COMPOSITION USED

BACKGROUND OF THE INVENTION

1. Field of the Invention

The present invention relates to a process for the production of a laminated, enamelled glazing comprising at least two glass sheets, whereof at least one is at least partly coated with at least one enamel coating on its face directed towards the interior of the laminate.

The invention also relates to an enamel composition advantageously usable in the aforementioned process, as well as to the products obtained according to said process.

2. Description of the Prior Art

Enamels are well known in the art and are in particular used on glass substrates such as glazings for vehicles or buildings. Inter alia they make it possible to form borders, decorative layers or protective layers. Thus, in car glazings, enamels are used for hiding the collective strips of heating systems or for hiding and protecting the actual heating systems. They are more particularly used for protecting adhesive beads used for the installation of the glazings in the vehicle body openings against light radiation and in particular UV radiation, whilst at the same time as masking the said beads.

The enamel used for such applications is generally formed from a powder incorporating a glass frit including pigments and a medium, also known as a vehicle or vector generally comprising a binder ensuring the cohesion of the enamel and the temporary adhesion of said enamel to the glass at the time of deposition, and an organic diluent or solvent making it possible to give the necessary viscosity for applying the enamel to the substrate.

In general terms, the enamel is deposited by screen printing. Thus, using this procedure, it is known to deposit the enamel on the substrate, dry the thus obtained layer in order to permit the elimination of the diluents in the enamel, optionally deposit other layers which also undergo drying, prior to the heat treatment of all the enamelled layers at a high temperature in order to vitrify the enamel and obtain the final covering.

In the case of laminated glazings comprising at least two glass sheets, it is known to deposit the enamel by screen printing on the face of one glass sheet which is to be turned towards the outside of the glazing, prior to the drying and then firing of said enamel, the firing of the enamel taking place during the simultaneous bending of the glass sheets of the glazing for bent, laminated glazings. A simultaneous bending of the glass sheets of a laminated glazing superimposed in their final order and with simultaneous firing of the enamel layer or layers located on at least one of the sheets is only possible when the enamel is intended to be located on the outside of the laminated glass. However, in the opposite case, where it is wished to provide a laminated glazing with an enamel layer on a substrate face to be in contact with another substrate of the laminated glazing, i.e. a face of the substrate turned towards the inside of a laminated glazing, the firing of the enamel during the simultaneous bending of the superimposed substrates in their final order causes numerous problems. Thus, the enamel incorporates components, particularly organic components, which, at the firing temperature, give off reaction products in gaseous form, which cannot be evacuated out of the space between the substrates. There is also a considerable risk of the substrates sticking to one another by means of the enamel during the melting of the latter.

In order to obviate these problems, it is known to bake the enamel on the planar substrate prior to bending. Thus, DE-A3,920,573 proposes subjecting the still planar, enamelled substrate to firing at a high temperature (approximately 600° C.), then allowing the substrate to cool before superimposing a second substrate and simultaneously bending the two substrates. This process makes it possible to solve the problems associated with the reaction gases, sticking being avoided by the use of separating or parting agents between the two substrates, but this involves the complying with several requirements. Thus, the enamelled substrate must remain flat and must have no internal stress liable to cause deformations during bending. The transportation of the substrates on conveying rollers can lead, for example, to minor deformations which are still adequate to ensure that the resulting glazings have inadequate optical properties. Moreover, a high temperature treatment prior to bending is expensive and may give rise to irreversible optical faults.

Another process described in application DE 4,201,275.9 proposes carrying out a prebending and a simultaneous baking of the enamel, but reversing the order of the substrates, so that the enamel-covered face is directed towards the outside. Following the cooling of the thus prebent substrates, the position of the substrates is reversed and said substrates are bent on their final shape, the enamelled substrate on this occasion having its enamel-covered face directed towards the inside of the laminated glazing. However, this process makes it necessary to have a supplementary bending stage, as well as a supplementary cooling stage, accompanied by a reversal of the substrates, so that costs are raised.

Therefore a first object of the invention is to obviate the problems of enamelling within a laminated glazing by proposing a simple and effective solution making it possible to obtain products of adequate quality at a lower cost and with improved productivity.

More particularly, the object of the invention is to develop a process for the production of a laminated, enamelled glazing, in combination with an appropriate composition, said process making it possible to simultaneously bend the substrates of the laminated glazing superimposed in their final order and a firing, during the bending, of the enamel used, when said enamel is located on one face of at least one of the substrates to be turned towards the inside of the laminated glazing, said process being simpler and having better performance characteristics than the aforementioned, known processes.

SUMMARY OF THE INVENTION

These objects are firstly achieved by means of a process for the production of a laminated glazing comprising at least two glass sheets and a "spacer", said laminated glazing being coated with at least one enamel layer over at least one part of the inner face of at least one of its glass sheets, in which deposition takes place of at least one layer of an enamel composition comprising a frit having anti-stick properties, a medium which is able to be eliminated at low temperature and optionally a low melting point frit, on at least one part of the inner face of at least one glass sheet, the enamelled glass sheet undergoes a heat treatment at a temperature between 150° C. and the deformation temperature of the glass in order to release the gaseous reaction products of the components of the enamel, making said enamel non-stick with respect to another glass sheet and optionally performing a preattachment of the enamel to the glass, and then on the enamelled face of the glass sheet is placed a second glass sheet prior to the simultaneous bending of the two sheets, the final firing of the enamel taking place during the bending, the glass sheets then being separated and assembled with the other elements of the glazings, such as the spacer or spacers.

The invention also covers an enamel composition for a glass substrate, said composition being usable with advantage for performing the aforementioned process, said composition including a frit having anti-stick properties, a medium which is able to be eliminated at low temperatures for application to the substrate and optionally a low melting point frit, said composition being also able to be used with advantage in other enamelling processes.

The invention also relates to a glazing comprising at least two glass sheets and a spacer, said glazing being obtained according to the process of the invention and being coated, on at least one part of the inner face of at least one of its glass sheets, with at least one enamel layer according to the invention.

DETAILED DESCRIPTION OF THE PREFERRED EMBODIMENTS

The term "heat treatment" is subsequently understood to mean, according to the invention, the particular heat treatment performed at a temperature between 150° C. and the deformation temperature of the glass, as indicated in the definition of the invention.

The term "inner face of a glass sheet" in a laminated glazing means, according to the invention, the face of the glass sheet turned or intended to be turned towards the inside of the laminated glazing, i.e. the face which is to be in contact with another element of the laminated glazing, such as a spacer.

The spacer of the laminated glazing produced according to the invention can be any type of spacer used at present in laminated glazings such as a thermoplastic spacing sheet, a gel, or an air sheet. In the latter case, the term multiple glazing is more appropriate than laminated glazing.

The term "frit" is understood to mean, according to the invention, a vitrifiable powder also containing pigments based on metal oxides.

The term "anti-stick" properties means, according to the invention, a non-sticking of the enamel layer deposited on a substrate with respect to an element coming into contact therewith during the bending operation.

The fact of using, in the process according to the invention, a frit having anti-stick properties makes it possible to avoid, following the heat treatment of the laminated sheets, enamel sticking problems during the bending stage. The frits having anti-stick properties according to the invention can in particular consist of frits containing elements forming crystalline phases, such as those described in EP 370,683 and in particular titanium dioxide or zirconium dioxide. They can also consist of frits containing oxidizable metals more particularly in powder form, like those described in EP 362,136 and EP 466,343 and in particular zinc in powder form, or refractory products having melting points above 650° C.

The expression "medium able to be eliminated at low temperature" is understood to mean, according to the invention, a medium also known as a vector which can incorporate solvents and/or diluents and/or oils and/or resins having a low molecular weight, the constituents of the medium being eliminatable, particularly by evaporation or carbonization, at a temperature below that giving rise to deformations of the glass and preferably at a temperature below 450° C.

This medium or vector has in particular the function of making the enamel composition suitable for application to the substrate by screen printing and maintains said composition on the substrate up to the heat treatment preceding the assembly of the glass sheets before the simultaneous bending of said glass sheets.

The medium or vector according to the invention inter alia makes it possible to perform the aforementioned heat treatment at low temperatures, the costs decreasing with the temperatures, and without any risk of the enamel-covered glass substrate undergoing deformation. When only a single enamel layer is to be deposited on the substrate, the medium or vector according to the invention may be free from resin and in particular consist of terpene derivatives such as gamma-terpineol or beta-terpineol. The absence of resin makes it possible, in most cases, to lower the temperature of the aforementioned heat treatment and is without any prejudicial consequences with respect to the process according to the invention in the case where a single enamel layer is deposited on the substrate, particularly when said enamel incorporates a low melting point frit according to the invention. However, the presence of resin is indispensable in certain cases when several enamel layers are deposited on the substrate, as explained hereafter.

The media used are in most cases organic media reacting with infrared radiation, but can also, if appropriate, be aqueous media and/or media reacting to other radiation types or treatments, particularly ultraviolet radiation.

According to the invention, the term "low melting point frit" means a frit whose melting point is below approximately 450° C. and preferably below approximately 400° C., said frit improving the adhesion of the enamelled layer prior to the final firing. Such a frit is in particular necessary for depositing another enamel layer on the first layer, said second enamel layer generally having to fulfil different functions. This is in particular the case with conductive enamelled layers based on silver paste which it is wished to deposit on a glazing in order to form heating systems or networks and which will be hidden from view by the first enamel layer. The presence of a low melting point frit in the composition of the first enamel layer then makes it possible to avoid delamination problems of the enamel layers prior to the final firing.

In the case where a single enamel layer is deposited on the substrate, the use of a low melting point frit in the enamel composition is not indispensable, delamination problems not occurring in the same way or with the same intensity as previously, but is still desirable, because the frit in question maintains the composition on the substrate and the cohesion of the enamel following the heat treatment stage according to the invention.

The low melting point frit according to the invention is used in proportions such that the anti-stick properties are not affected. These proportions are in general, approximately 2 to 30% by weight and preferably, in the case where use is made of a low melting point frit with a melting point between 300° and 450° C., approximately 5 to 15% by weight. The low melting point frits according to the invention can in particular consist of lead silicates, lead oxides or boric derivatives.

Among the low melting point frits, it can be desirable to use "very low melting point" frits, i.e. frits with a melting point below approximately 300° C., said frits e.g. consisting of boric acid derivatives. Very low melting point frit compositions are in particular illustrated by the following examples 2 and 3.

Advantageously, the deposition of the enamel layer according to the invention takes place by screen printing. Heat treatment preferably takes place at temperatures below approximately 450° C. and said temperatures can descend to approximately 150° to 200° C. when the medium or vector contains no resin. When the enamel composition used comprises a low melting point frit, the heat treatment temperature is preferably above the Littleton point of the low melting point frit and is advantageously close to the melting point of said frit. The low temperature heat treatment according to the invention is in particular made possible by the choice of the components of the enamel and mainly makes it possible to release the gaseous reaction products of the enamel components, whilst at the same time making the enamel non-stick with respect to another glass sheet and, when the enamel comprises a low melting point frit, whilst carrying out a preattachment of the enamel by melting said low melting point frit, without any risk of deformation of the glass substrates due to the relatively low operating temperature.

The bending according to the invention takes place at around 600° C., particularly by gravity and in accordance with a known process. The separation of the bent substrates and their reassembly following the addition of a spacer between said substrates also takes place in accordance with known processes.

The process according to the invention, as defined hereinbefore, permits the performance of an enamelling of the faces of the substrates in the interior of the bent, laminated glazings in a manner which is as simple and effective as the conventional enamelling processes on faces of glass substrates to be located to the exterior of bent, laminated glazings without encountering the sticking problems or the problems of removing gaseous reaction products referred to hereinbefore.

According to an embodiment of the invention, at least one second enamel layer is deposited on the first enamel layer having a composition according to the invention prior to the heat treatment of the two deposited layers, said second layer being able to have the composition explained in the definition of the invention, but usually being a layer of a conductive enamel such as a silver paste-based enamel, the enamel according to the invention being compatible with such enamels. This deposition of a second layer, preferably by screen printing, requires beforehand a thermal pretreatment also referred to as "drying" of the deposited, first layer. Moreover, the enamel used for producing said first layer necessarily incorporates in this embodiment of the invention, a low melting point frit, as defined hereinbefore.

In the case where the low melting point frit used in this embodiment of the invention has a melting point between approximately 300° and approximately 450° C., the medium or vector used in combination with said frit and the frit having anti-stick properties, necessarily incorporates at least one resin, more particularly serving as a film forming agent for the second layer, and the second deposited layer also undergoes a thermal pretreatment or drying before the heat treatment of the two layers.

The resins used in this embodiment of the invention can in particular consist of an acrylic acid ester such as a polyalkylacrylate, particularly polybutyl methacrylate or polymethyl methacrylate, in this case the medium also incorporating an oil, a diluent or a solvent such as a terpene derivative. It is also possible to use media or vectors essentially based on resins reacting to UV rays, such as the media described in FR 2,512,434 and in particular media based on resins chosen from among acrylic monomers and unsaturated polyesters in the presence of photoinitiators such as benzoin alkyl either and it is possible for said media reacting to UV to be free from solvents. It is also possible to use aqueous media incorporating resins such as cellulose acetates.

In the aforementioned embodiment using as the composition of the first enamel layer deposited a low melting point frit, whose melting point is between approximately 300° and 450° C., a medium incorporating a resin and a frit having anti-stick properties, the first and second enamel layers are thus subject to a thermal pretreatment or drying, each following the respective deposition and prior to the heat treatment of the assembly. The thermal pretreatment or drying corresponds, according to the invention, to the elimination of the diluents from the enamel, said diluents only being necessary for giving the desired viscosity to the enamel with a view to the deposition of said enamel, and/or make it possible to carry out the polymerization and/or crosslinking of certain compounds of the medium, the polymerized or crosslinked compounds being subsequently burnt during the heat treatment according to the invention. The thermal pre-treatment or drying according to the invention can take place, as a function of the particular case and the constituents of the medium, by infrared radiation, ultraviolet radiation, microwaves, hot air, etc.

It is necessary to distinguish the thermal pretreatment or drying referred to hereinbefore and the heat treatment according to the invention. The thermal pretreatment or drying carried out on the first, deposited enamel layer makes the latter suitable for receiving a second layer by giving it a sufficient cohesion and in more general terms, with respect to each deposited enamel, permits the temporary fixing of said enamels by the elimination of diluents and/or polymerization and/or crosslinking of certain components of the medium.

Afterwards, the heat treatment stage eliminates, by carbonization or evaporation, the remaining parts, which may or may not be polymerized and may or may not be crosslinked, from the medium, said parts being able to give rise to gas leaks, and permits, in this embodiment of the invention where the enamel used comprises a low melting point frit, to maintain the adhesion of the enamel layers to the substrate and to one another by the melting of the low melting point frit, the medium burnt by the heat treatment no longer providing said adhesion. The heat treatment also reveals the anti-stick properties of the second frits used in the enamel composition according to the invention and thus prevents the subsequent sticking of the enamels to the glass sheet coming into contact therewith during bending.

It is also pointed out that in the aforementioned embodiment, where two enamel layers are deposited and where a low melting point frit, whose melting point is between 300° and 450° C. is used, the pretreatment or drying takes place at temperatures below 100° C., whereas the heat treatment takes place at more unusual temperatures between 150° C. and the deformation temperature of the glass and preferably between 150°/200° C. and 450° C., as indicated hereinbefore.

It is also pointed out that in the case where a single enamel layer is deposited in accordance with the invention, the heat treatment has, in the same way as when several layers are deposited, the function of eliminating those parts of the medium which can give rise to gas leaks, prevents the subsequent sticking of the enamel to the glass sheet coming into contact therewith during bending and optionally ensures the adhesion or preattachment of the enamel to the glass by melting the low melting point frit when the latter is present in the enamel composition. Thus, the heat treatment according to the invention differs from the conventional drying operations which can be carried out on enamelled substrates, said operations only making it possible to eliminate the diluents from the enamel and only permitting a temporary fixing of the enamels by the medium prior to the final fixing of the enamels by the melting of the frits forming them.

As a variant of the embodiment according to the invention according to which at least one second enamel layer is deposited on the first enamel layer according to the invention, it is possible to use an enamel composition incorporating a very low melting point frit, whose melting point is below 300° C., in place of a low melting point frit, whose melting point is between 300° and 450° C. In this case, the presence of resin within the medium of the composition of the first enamel layer is not necessary (the medium then preferably consists of solvents and/or diluents and/or oils such a terpene derivatives), unlike in the case where the low melting point frit used is a frit with a melting point between 300° and 450° C. Here also, the thermal pretreatment or drying of the second enamel layer can be eliminated, whereas the thermal pretreatment or drying of the first layer is optionally performed at temperatures higher than those mentioned hereinbefore and which can extend up to 350° C. The second enamel layer is deposited in this way on the first enamel layer following the thermal pretreatment or drying of said first layer and then the enamelled glass sheet is directly exposed to the heat treatment according to the invention.

Although the enamel compositions used in the process according to the invention are particularly appropriate for said process, they can also be used with advantage in other enamelled glazing production processes and for coating any glass substrate type not necessarily belonging to a laminated glazing.

The enamel compositions according to the invention comprise a frit having anti-stick properties, a medium able to be eliminated at low temperature for application to the substrate and optionally a low melting point frit.

The characteristics of the components of the enamel are those referred to in the process according to the invention. The frit having anti-stick properties is that described in the process, the medium is also that described hereinbefore, with or without resin, and the low melting point frit is as described hereinbefore.

The enamel composition according to the invention incorporating a low melting point frit is particularly interesting for the covering of glass substrates, no matter what the substrate and process used.

The process according to the invention can be used for producing any type of laminated glazing covered by enamel on one substrate face located on the interior of said laminated glazing. The process according to the invention can in particular be used for producing laminated glazings for vehicles enamelled on face 2, i.e. enamelled on a glass sheet face oriented towards the spacer, the face 1 being the face oriented towards the outside of the vehicle.

An example of application of the process according to the invention relates to the production of a laminated car glazing provided with a heating system constituted by fine, electrical resistance wires embedded in a spacer of the laminated glazing and connected to collecting strips, particularly made from conductive enamel or of metallic elements, which are themselves connected to power supplies. In this case, the enamel deposited according to the process of the invention on one face of a glass substrate of a laminated glazing directed towards the spacer, particularly face 2 of the laminated glazing, can be used for masking the collecting strips.

Another exemplified application relates to the production of a laminated car glazing provided with a heating system consisting of a conductive enamel on one part of the face of the external or outer substrate, said face being located on the interior of the laminated glazing, as described in U.S. Pat. No. A4,373,130. This heating system is used for deicing or thawing windscreen wipers located on the other face of the aforementioned outer substrate and it is deposited as a second enamel layer on a first enamel layer according to the invention used for masking it. It should be noted in this connection that the second layer deposited, when conductive, can also extend beyond the first enamel layer, e.g. in order to come into contact with another conductive layer of the glazing. It is also pointed out that glazings which can be produced according to the invention can also comprise a second or several other layers of a conductive enamel or a random enamel without the same necessarily being deposited on the first layer of an enamel according to the invention. A second enamel layer can thus be located at a point of the laminated glazing different from the carrying at least one enamel layer according to the invention.

The glazings obtained according to the invention comprise at least two glass sheets and a spacer, said glazings being covered, on at least one part of the inner face of at least one of their glass sheets by at least one enamel layer according to the invention and these glazings have their optical properties maintained.

The following examples illustrate in a non-limitative manner enamel compositions according to the invention and processes for enamelling the associated laminated glazings.

EXAMPLE 1

In this example, the enamel compositions produced comprises a frit having anti-stick properties, a low melting point frit and a medium or vector with resin in the following weight proportions:

80 parts of a frit having anti-stick properties and the following composition:

| | |
|---|---|
| PbO | 38% |
| $Cr_2O_3$ | 20% |
| CuO | 19% |
| $SiO_2$ | 6% |
| MnO | 4% |
| $TiO_2$ | 9% |
| $B_2O_3$ | 1% |
| $Al_2O_3$ | 0.5% |
| $ZrO_2$ | 2.5% |

10 parts of a low melting point frit having the following composition:

| | |
|---|---|
| $Pb_3O_4$ | 60% |
| $PbSiO_3$ | 22% |
| $H_3BO_3$ | 18% |

20 parts of a medium formed from 18 parts of terpene derivatives of the gamma-terpineol type (1-methyl-cyclohexan-1-ol-4-isopropylene) and beta-tarpineol and 2 parts of a polybutyl methacrylate resin.

This enamel is deposited by screen printing on the face of a glass sheet intended to be face 2 of a laminated glazing for a vehicle, said face being oriented towards the spacer, face 1 being the face oriented towards the outside of the vehicle. The enamel is then dried at about 80° to 100° C. and then a silver paste-based conductive enamel layer is deposited on the first enamel layer before in turn undergoing drying at around 100° C. The enamelled glass substrate then undergoes a heat treatment at around 400° C. before associating it with a second glass sheet which is placed above the enamelled face and the stack then undergoes bending in accordance with conventional procedures by gravity, prior to the separation of the glass sheets and assembly with a plastics material spacer.

EXAMPLE 2

In this example, the enamel composition according to the invention comprises, apart from a frit having anti-stick properties and a resin-free vector or medium, a very low melting point frit, whose Littleton point is 260° C. and having the following composition:

| $B_2O_3$ | 100% |
|---|---|

The process associated with the use of this composition is as follows. The enamel is deposited by screen printing on the face of a glass sheet which is to be face 2 of a laminated glazing, as in Example 1. The enamel is then dried by infrared at approximately 300° C. and then a silver paste-based conductive enamel layer is deposited on the first enamel layer and the thus enamelled substrate undergoes a heat treatment at around 300° C. before being associated with a second glass sheet which is placed above the enamelled face. The stack then undergoes bending in accordance with conventional gravity methods prior to the separation of the glass sheets and assembly with a plastics material spacer.

EXAMPLE 3

In this example, the enamel composition according to the invention comprises a frit having anti-adhesive properties, a resin-free vector or medium and a very low melting point frit, whose Littleton point is 135° C. and having the following composition:

| $Na_2O$ | 20.8% |
|---|---|
| $P_2O_5$ | 62.5% |
| $H_2O$ | 16.7% |

The process associated with the use of this composition is similar to that of Example 2, the drying temperature and the heat treatment temperature being in this case approximately 200° C.

We claim:

1. Process for the production of a laminated glazing comprising at least two glass sheets and a spacer, said process comprising coating with at least one enamel layer at least one part of the inner face of at least one glass sheet, said enamel layer being formed from an enamel composition comprising a frit having anti-stick properties, a medium which is able to be eliminated at low temperature and a frit having a melting point below approximately 450° C., heat treating the enamelled glass sheet at a temperature between 150° C. and the deformation temperature of the glass in order to release the gaseous reaction products of the components of the enamel, make said enamel non-stick with respect to another glass sheet and perform a preattachment of the enamel to the glass, placing a second glass sheet on the enamelled face of the glass sheet, simultaneously bending the two sheets and final firing the enamel, separating the glass sheets and assembling the glass sheets with the spacer.

2. Enamel composition used for performing the process according to claim 1, characterized in that it comprises a frit having antistick properties, a medium which is able to be eliminated at low temperatures for application to the substrate and a frit having a melting point below approximately 450° C.

3. Process for the production of a laminated glazing comprising at least two glass sheets and a spacer, said process comprising coating with at least one enamel layer at least one part of the inner face of at least one glass sheet, said enamel layer being formed from an enamel composition comprising a frit having anti-stick properties and a medium which is able to be eliminated at low temperature, heat treating the enamelled glass sheet at a temperature between 150° C. and the deformation temperature of the glass in order to release the gaseous reaction products of the components of the enamel and make said enamel non-stick with respect to another glass sheet, placing a second glass sheet on the enamelled face of the glass sheet, simultaneously bending the two sheets and final firing the enamel, separating the glass sheets and assembling the glass sheets with the spacer, characterized in that the frit having anti-stick properties has the following composition

| PbO | 38% |
|---|---|
| $Cr_2O_3$ | 20% |
| CuO | 19% |
| $SiO_2$ | 6% |
| MnO | 4% |
| $TiO_2$ | 9% |
| $B_2O_3$ | 1% |
| $Al_2O_3$ | 0.5% |
| $[ZnO_2]$ $SZrO_{2SS}$ | 2.5% |

4. Process according to claims 1 or 3, characterized in that enamel deposition takes place by screen printing.

5. Process according to claims 1 and 3, characterized in that the heat treatment takes place at temperatures between 150° and 450° C., bending taking place at around 600° C.

6. Process according to claim 3, characterized in that the enamel composition comprises a low melting point frit, whose melting point is below approximately 450° C.

7. Process according to claims 1 or 6, characterized in that the heat treatment takes place at temperatures above the Littleton point of the low melting point frit.

8. Process according to claims 1 or 6, characterized in that the low melting point frit is present in the enamel composition in proportions between 2 and 30% by weight.

9. Process according to claims 1 to 6, characterized in that deposition takes place of a first layer of the enamel composition incorporating the frit with anti-stick properties, the medium and the low melting point frit on at least one part of the inner face of the glass sheet, the thus deposited enamel layer undergoes a thermal pretreatment and then a second enamel layer is deposited on at least the first deposited layer and the thus enamelled glass sheet undergoes the heat treatment prior to the association operations and then the simultaneous bending of the glass sheets.

10. Process according to claim 9, characterized in that the second enamel layer undergoes a thermal pretreatment, the thermal pretreatments taking place at temperatures below 100° C.

11. Process according to claim 10, characterized in that the melting point of the low melting point frit is between 300° and 450° C. and the medium incorporates a resin.

12. Process according to claim 9, characterized in that the melting point of the low melting point frit is below 300° and the thermal pretreatment takes place at a temperature below 350° C.

13. Process according to claim 9, characterized in that the second enamel layer deposited is a conductive enamel layer.

14. Glazing obtained by the process according to claims 1 or 3, incorporating at least two glass sheets and a spacer and covered, on at least one part of the inner face of at least one of its sheets by at least one layer of an enamel composition comprising at least one frit having anti-stick properties, a medium able to be eliminated at low temperatures for application to the substrate and a frit having a melting point below approximately 450° C.

15. Glazing according to claim 14, characterized in that it comprises a spacer, in which are embedded fine electrical resistance wires connected to collecting strips in front of which are located at least one part of at least one deposited enamel layer.

16. Glazing according to claim 14, characterized in that it is covered with two enamel layers, whereof one is a conductive enamel layer and which optionally extends beyond the other deposited layer.

17. Glazing obtained by the process according to claims 1 or 3, incorporating at least two glass sheets and a spacer and covered, on at least one part of the inner face of at least one of its sheets by at least one layer of an enamel composition comprising at least one frit having anti-stick properties and having the following composition

| | |
|---|---|
| PbO | 38% |
| $Cr_2O_3$ | 20% |
| CuO | 19% |
| $SiO_2$ | 6% |
| MnO | 4% |
| $TiO_2$ | 9% |
| $B_2O_3$ | 1% |
| $Al_2O_3$ | 0.5% |
| $ZrO_2$ | 2.5% | and a medium which is able to be eliminated at low temperatures for application to the substrate.

18. Glazing according to claim 17, characterized in that it comprises a spacer, in which are embedded fine electrical resistance wires connected to collecting strips in front of which are located at least one part of at least one deposited enamel layer.

19. Glazing according to claim 17, characterized in that it is covered with two enamel layers, whereof one is a conductive enamel layer and which optionally extends beyond the other deposited layer.

20. Enamel composition used for performing the process according to claim 3, characterized in that it comprises a frit having anti-stick properties and having the following composition

| | |
|---|---|
| PbO | 38% |
| $Cr_2O_3$ | 20% |
| CuO | 19% |
| $SiO_2$ | 6% |
| MnO | 4% |
| $TiO_2$ | 9% |
| $B_2O_3$ | 1% |
| $Al_2O_3$ | 0.5% |
| $ZrO_2$ | 2.5% | and a medium which is able to be eliminated at low temperatures for application to the substrate.

21. Enamel composition for a glass substrate comprising at least one frit having anti-stick properties, a medium able to be eliminated at low temperatures for application to the substrate and a frit having a melting point below approximately 450° C.

22. Enamel composition for a glass substrate comprising at least one frit having anti-stick properties and having the following composition

| | |
|---|---|
| PbO | 38% |
| $Cr_2O_3$ | 20% |
| CuO | 19% |
| $SiO_2$ | 6% |
| MnO | 4% |
| $TiO_2$ | 9% |
| $B_2O_3$ | 1% |
| $Al_2O_3$ | 0.5% |
| $ZrO_2$ | 2.5% | and a medium which is able to be eliminated at low temperatures for application to the substrate.

23. Glazing incorporating at least one glass substrate, characterized in that it is at least partly covered by an enamel composition according to claims 21 or 22.

24. Enamel composition according to claim 22, characterized is that it comprises a low melting point frit, whose melting point is below approximately 450° C.

25. Enamel composition according to claims 2 or 24, characterized in that the low melting point frit is present in said composition in proportions from 2 to 30% by weight.

26. Enamel composition according to claim 25, characterized in that the melting point of the low melting point frit is between 300° and 450° C. and the low melting point frit is present in the enamel composition in proportions form 5 to 15% by weight.

* * * * *

UNITED STATES PATENT AND TRADEMARK OFFICE
CERTIFICATE OF CORRECTION

PATENT NO. : 5,605,591
DATED : FEBRUARY 25, 1997
INVENTOR(S) : ANDRE BEYRLE, ET AL

It is certified that error appears in the above-indentified patent and that said Letters Patent is hereby corrected as shown below:

Column 8, line 64, "$H_3BO_3$" should read --$H_3HO_3$--.

Column 10, line 40 "[$ZnO_2$] \$$ZrO_{2ss}$" should read --$ZrO_2$--.

Column 12, line 52 "proportions form 5" should read --proportions from 5--.

Signed and Sealed this

Twenty-third Day of June, 1998

*Attest:*

BRUCE LEHMAN

*Attesting Officer*  Commissioner of Patents and Trademarks